United States Patent
Sterling

(10) Patent No.: US 7,014,119 B2
(45) Date of Patent: Mar. 21, 2006

(54) METHOD OF MANUFACTURING SMART CARDS

(75) Inventor: Laurence Sterling, Chatswood (AU)

(73) Assignee: Keycorp Limited, Chatswood (AU)

( * ) Notice: Subject to any disclaimer, the term of this patent is extended or adjusted under 35 U.S.C. 154(b) by 139 days.

(21) Appl. No.: 10/476,630

(22) PCT Filed: May 2, 2002

(86) PCT No.: PCT/AU02/00545

§ 371 (c)(1),
(2), (4) Date: Oct. 31, 2003

(87) PCT Pub. No.: WO02/089049

PCT Pub. Date: Nov. 7, 2002

(65) Prior Publication Data

US 2004/0133800 A1    Jul. 8, 2004

(30) Foreign Application Priority Data

May 2, 2001    (AU)    .................................... PR4714

(51) Int. Cl.
*G06K 19/00* (2006.01)
(52) U.S. Cl. .................. 235/487; 235/380; 235/375
(58) Field of Classification Search ................ 235/375, 235/380, 382, 487, 492; 700/225; 705/205
See application file for complete search history.

(56) References Cited

U.S. PATENT DOCUMENTS

| | | | |
|---|---|---|---|
| 4,825,054 A * | 4/1989 | Rust et al. ................... | 235/380 |
| 4,827,425 A * | 5/1989 | Linden ....................... | 700/225 |
| 5,214,409 A | 5/1993 | Beigel | |
| 5,379,344 A | 1/1995 | Larsson et al. | |
| 5,721,777 A | 2/1998 | Blaze | |
| 5,943,624 A | 8/1999 | Fox et al. | |
| 5,960,082 A | 9/1999 | Haenel | |
| 2004/0215674 A1 * | 10/2004 | Odinak et al. .............. | 707/205 |

FOREIGN PATENT DOCUMENTS

EP    0 275 510    7/1988

* cited by examiner

*Primary Examiner*—Karl D. Frech
(74) *Attorney, Agent, or Firm*—Sacco & Associates, PA

(57) ABSTRACT

A smartcard (1) has a memory (2) of a ROM portion (3) and an EEPROM portion (4). A first type of data will be required throughout the life of smartcard (1) is stored in ROM portion (3). A second type of program data which is to be used a predetermined number of times early on in the life of smartcard (1) is stored in EEPROM portion (4). Generally, the second type of data is stored in at least one lower memory address portion (8) of EEPROM (4). The second type of program data is moved from its lower memory address portion in EEPROM (4) to a higher memory address portion (9) for execution. The data is then deleted from higher memory address portion (9).

22 Claims, 3 Drawing Sheets

US 7,014,119 B2

METHOD OF MANUFACTURING SMART CARDS

TECHNICAL FIELD

The present invention relates to a method of manufacturing smartcards and smartcards produced therefrom and, in particular, to a method of manufacturing smartcards so as to more efficiently employ memory that is provided on the cards.

The invention is being developed primarily for use in the manufacturing of smartcards and will be described hereinafter with reference to this application. However, it will be appreciated that the invention is not limited to this particular field of use.

BACKGROUND ART

Smartcards are being used more and more in everyday life, for example, in automated vehicle tolling systems and cellular telephones. When a smartcard is manufactured, it must be enabled and then personalised prior to dispensing the cards to a user.

Smartcards are generally provided with two types of memory that can be used to store executable programmes. The first type of memory is read only memory (ROM) which is programmed at the time of manufacturing and subsequently cannot be erased or altered. The second type of memory is generally some form of modifiable non-volatile memory which can be read from and written to during the life of the card.

It is a common approach when manufacturing smartcards to place those parts of the application that will never be changed into the card's ROM and use the modifiable memory for data or executable applications that may change during the life of the card. The capacity of ROM and modifiable memory is limited so it is desirable to maximise the efficiency of its use to optimise the card's intended application or applications. Accordingly, any means of more efficiently using the memory on the smartcards will provide an advantageous result. Previous solutions to the problem of having insufficient memory means on smartcards have been proposed, however, these primarily relate to more complex methods of writing data to ROM. For example, EP0275510 (IBM) discloses smartcards having memory means, the cards being manufacturing such that the memory means is at least partially unused or altogether without application programmes loaded into the ROM. The citation allows appropriate application programmes to be loaded into the ROM at a later stage.

The disclosure provides this such that when the card is manufactured it is provided with a bootstrap program which allows subsequent applications to be later loaded and stored in the ROM. This provides an advantage of allowing parallel manufacture of the cards and development of the software because, traditionally, software had to be completely developed and tested before storing in ROM, since ROM could not be altered. This resulted in the need to discard the smartcard if an error had occurred or changes to an application program needed to be made.

U.S. Pat. No. 5,960,082 (Haenel) is directed toward the creation of a flexible means for the post initialisation of chipcards which provides for more cost effective production. The patent provides for the writing of additional applications onto the chipcard at any point in time after the conclusion of initialisation, whereby commands and keys which already exist on the chip are utilised therefor. Primarily, the citation is directed toward loading key data into non-volatile memory.

The disclosure of U.S. Pat. No. 5,214,409 (Beigel) relates to cooperative identification systems in which the identifying agency and the object to be identified cooperate in the identification process according to a prearranged scheme. The patent employs programmable ROMs (in a transponder/tag device) that are programmed either by the manufacturer or by the user prior to implantation of objects to be identified. Communication between the tag and a reader is accomplished by the reader establishing a reversing magnetic field in the vicinity of the tag and the tag varying its absorption of power from the field in accordance with the information to be transmitted. It is an object of the present invention to provide a method for manufacturing smartcards and the cards produced therefrom that will enable more efficient use of smartcard memory means.

SUMMARY OF THE INVENTION

According to a first aspect of the invention there is provided a method for manufacturing a smartcard having a memory means, the method including the steps of:

storing program data of a first type which will be required throughout the life of the card in a read only memory portion of the memory means;

storing program data of a second type which will not be required throughout the life of the card in a modifiable portion of the memory means; and wherein the program data types are stored in their respective memory portions at the card manufacturing stage and the second type of program data is deleted once it has been employed.

Preferably, when employing the second type of program data, the method further includes the steps of storing this data into a first part of the modifiable memory portion such that when it is called for, it is moved from the first part of the modifiable memory portion to a latter part of the modifiable memory portion and executed. Subsequent to the execution of the data, it is deleted from the modifiable memory means.

Even more preferably, the second type of data is used once for the process of verifying the authenticity of the card subsequent to manufacturing, the method further includes the step of verifying authenticity of the card in the process of enabling the card wherein once the data in this step has been employed, the second type of data is deleted from the modifiable memory portion of the card.

According to a second aspect of the invention there is provided a method for manufacturing a multi-application smartcard having a memory means, the method including the steps of:

storing program data of a first type for each application which will be required throughout the life of the card in respective read only memory portions of the memory means;

storing program data of a second type for each application which will not be required throughout the life of the card in respective modifiable portions of the memory means; and wherein the program data types for each application are stored in their respective memory portions at the manufacturing stage of the card and the respective parts of the second type of program data for each application are deleted once employed.

Preferably, when employing the second type of program data for each application, the method further includes the steps of the storing data for one or more applications into a first part of the modifiable memory portion such that when it is called for, it is moved from the first part of the modifiable memory portion to a latter part of the modifiable memory portion and executed. Subsequent to the execution of this data, the respective second type of data for the one or more applications is deleted from the modifiable memory means.

Preferably, the second type of program data is data employed only by an operating system on the smartcard.

In alternative embodiments, the respective second type of data is used once for the process of verifying the authenticity of the card subsequent to manufacturing and the method further includes the step of verifying the authenticity of the card in the process of enabling the card wherein once the data in this step has been employed, the respective second type of data is then deleted from the modifiable memory portion of the card.

Preferably, both portions of the card's memory include respective portions of a multi-application operating system (for example MULTOS) and the step of verifying the authenticity of the card is executed by means of a command in the form of CHECKDATA, the command being of the second type of application program data and stored in the modifiable portion of the memory. Also preferable, the step of providing personalised data to the card enables the card for use and is executed by means of a command in the form of SET MSM CONTROLS, the command being of the second type of application program data. Subsequently, the data employed in this step and the step of verifying the card deleted after its execution.

According to another aspect of the invention there is provided a smartcard having a memory means, the smartcard including:

a processing means;

a read only portion of memory in communication with the processor;

a modifiable portion of memory in communication with the processor;

input and output means on the card in communication with the processor and being externally accessible; and wherein program data of a first type corresponding to data which will be required throughout the card's life is stored in the read only portion of the memory and program data of a second type corresponding to data which will not be required throughout the card's life is stored in the modifiable portion of the memory such that once the second type of data has been employed, it is deleted.

Preferably, the second type of data is moved from a first part of the modifiable memory portion to a second part of this memory portion when it is required and deleted from the second part of the modifiable memory portion subsequent to execution. In alternative embodiments, the second type of data is employed only once during the life of the smartcard.

It is the case that there are certain portions of a smartcards application that may only be used during the early stages of the card's life. For example, card activation data which is used only once prior to the loading of any application software or personalisation data.

Preferably also, the smart card includes a MULTOS operating system and the cards is authenticated by employing a checkdata command stored in the modifiable portion of the memory means such that once executed it is moved from the first portion of the modifiable memory means to a second portion of the modifiable memory means and, once the cards is authenticated, that data in the second portion of the modifiable memory means is deleted.

More preferably, the smart card is personalised after being authenticated by employing a Set MSM Controls command stored in the modifiable portion of the memory means such that when executed it is moved from the first portion of the modifiable memory means to the second portion of the modifiable memory means and, once the card is personalised, that data in the second portion of the modifiable memory means is deleted.

Once this early phase is completed, that portion of executed application code will never be required again. Therefore, it is disadvantageous to place this code into the card's ROM where once written and executed it must remain such that it is effectively occupying ROM memory space that may be better used by other applications and/or data.

Therefore, rather than placing application code into the ROM of a smartcard, it would be advantageous to place the code in its non-volatile memory at manufacturing so that once the code has been employed for its required purpose early in the card's life, it can be erased and from the area of non-volatile memory that it occupied and so free up that memory for future use. This would reduce the amount of required ROM memory which could be used for other purposes.

The method and smartcards produced therefrom advantageously provide an extra level of security wherein once a card is enabled and personalised, it can not be re-enable or re-personalised by unauthorised parties because the data required in these processes is deleted from the smartcards memory after it is executed.

BRIEF DESCRIPTION OF THE DRAWINGS

Preferred embodiments of the invention will now be described, by way of example only, with reference to the accompanying drawing in which.

DESCRIPTION OF THE PREFERRED EMBODIMENTS OF THE INVENTION

Figure 1:
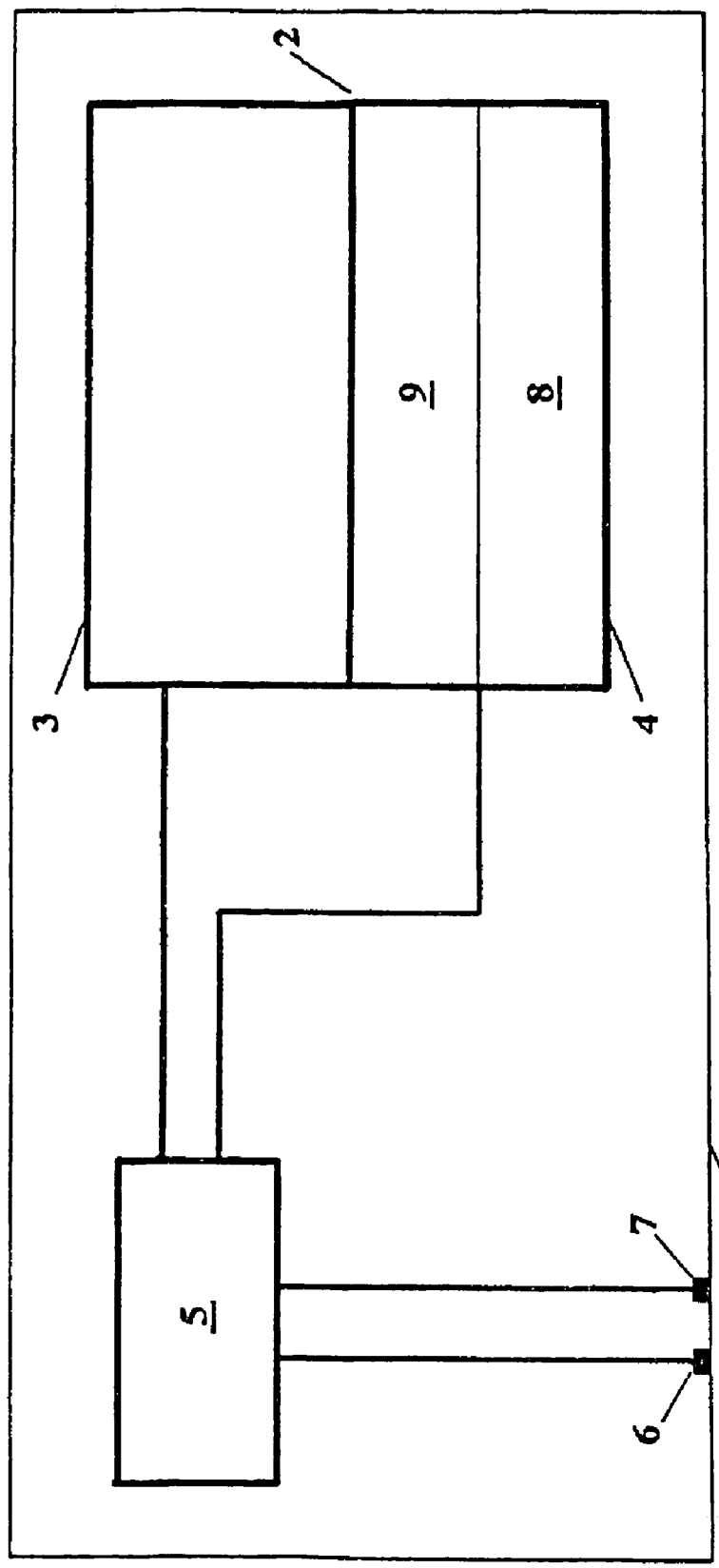
FIG. 1 is a block diagram view of a smartcard according to the invention.

Referring to FIG. 1 there is illustrated a schematic diagram of a smartcard (1). Smartcard (1) includes memory means (2) having a non-volatile portion (3) in the form of read-only memory (ROM) and a modifiable non-volatile portion (4) in the form of an EEPROM.

Smartcard (1) further includes processing means (5) in the form of a CPU which is in communication with each portion (3) and (4) of memory means (2). Smartcard (1) further includes an input (6) and an output (7) in the form of externally accessible electrical contacts which are in communication with processor (5).

Smartcard (1) is configured so that a first type of data corresponding to that which will be required throughout the life of smartcard (1) is stored in ROM memory (3). A second type of program data which is to be used a predetermined number of times early on in the life of smartcard (1) is stored in modifiable memory portion (4). Generally, the second type of data is stored in at least one lower memory address portion (8) of modifiable memory portion (4) and the second type of program data is only to be employed once throughout the life of the smartcard.

Figure 2:
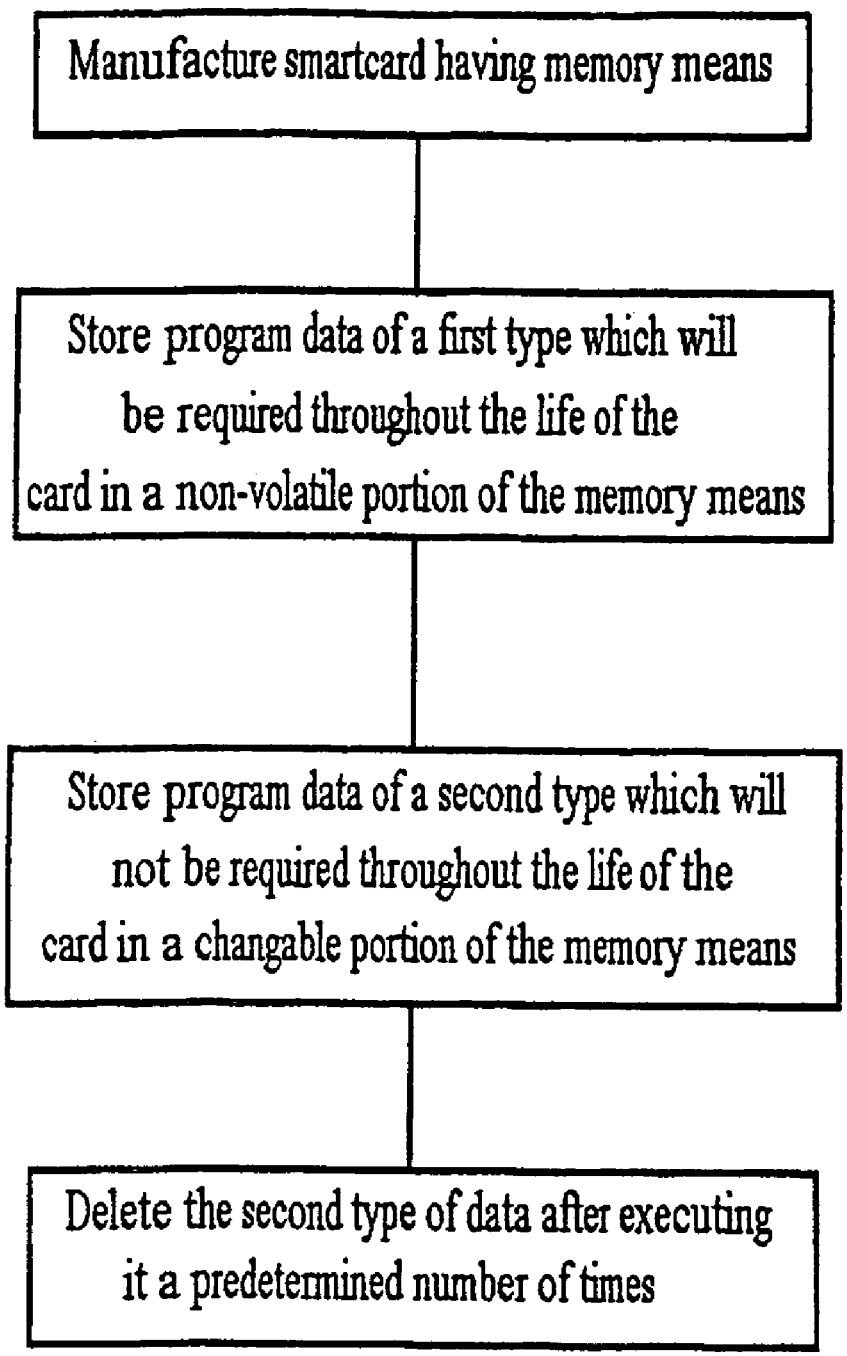
FIG. 2 is a flow chart illustrating method for manufacturing smartcards according to the invention.

When the second type of program data is called for execution, it is moved from its lower memory address portion in modifiable memory (4) to a higher memory address portion (9). The data is then deleted from higher memory address portion (9). Therefore, this second type of program data is removed from memory after execution so as to allow future use of the modifiable memory portion (4) to be optimised. However, in some embodiments of the invention the step of moving the second type of data is stored in lower memory address portion (8) of modifiable memory portion (4) to higher memory address portion (9) is not required. This method is broadly illustrated in flow chart form in FIG. 2.

In some other preferred embodiments, not illustrated, the second type of program data is data employed only by an operating system on the smartcard.

Smartcard (1) may also be employed as a multi-application smartcard. A dual application smartcard is shown in FIG. 3, however, it will be appreciated that any number of applications may be employed on the card.

In multi-application cases, respective first types of data corresponding to those which will be required throughout the life of smartcard (1) are stored in respective ROM memory (3) portions (10) and (11). Respective second types of program data which are to be used a predetermined number of times early on in the life of smartcard (1) are stored in respective modifiable memory (4) portions (12) and (13). Generally, the second type of data for each application is stored in respective lower memory address portions (12a) and (13a).

When the second type of program data for respective applications is called for execution, it is moved from its respective lower memory address portions (12a) and (13a) to respective higher memory address portions (12b) and (13b) in modifiable memory portions (12) and (13). The data is then deleted from the higher memory address portions (12b) and (13b). As with a single application smartcard described above, some embodiments of the invention the step of moving the respective second type of data stored in lower memory address portions (12a) and (13a) of modifiable memory portions (12) and (13) to higher memory address portions (12b) and (13b) is not required.

Figure 3:
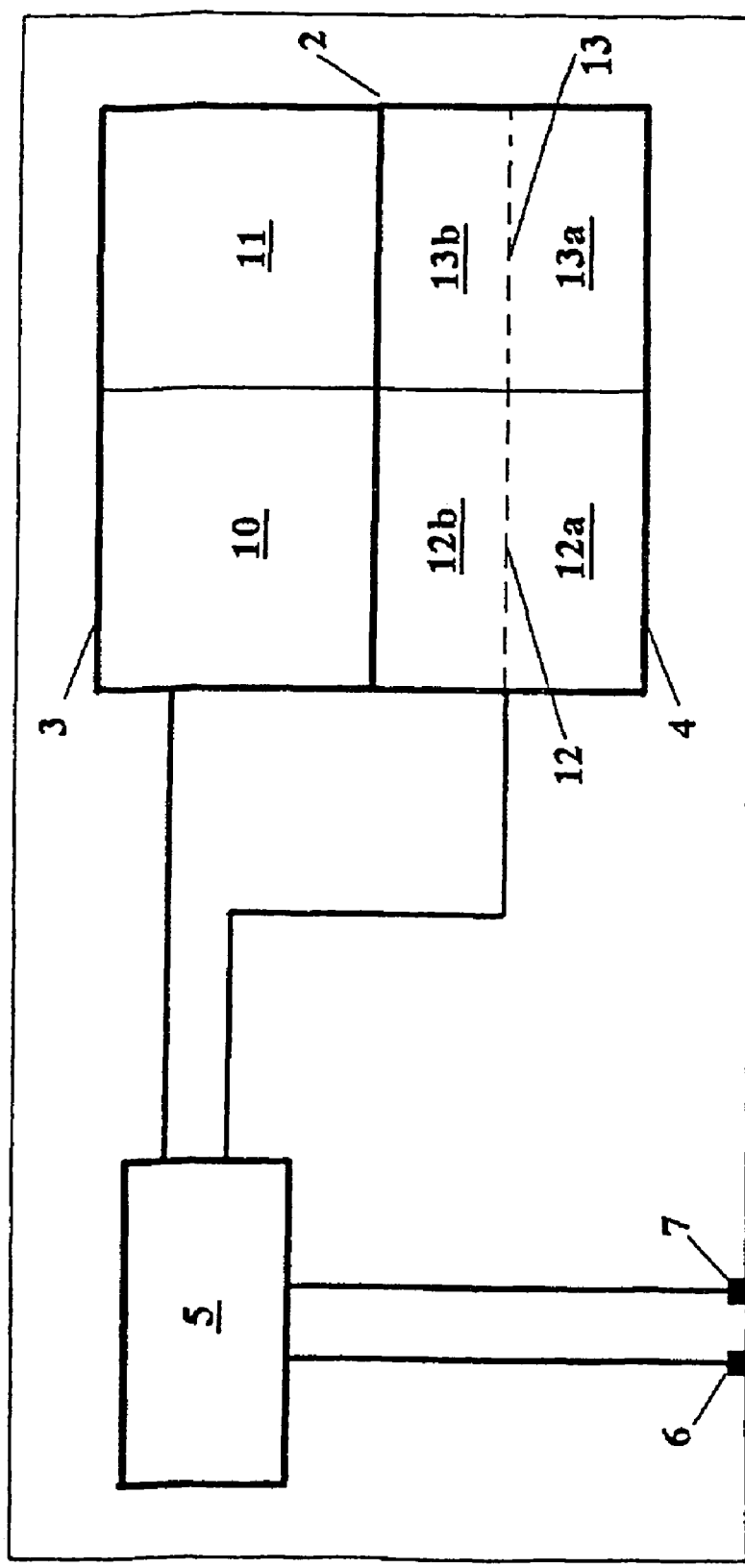
FIG. 3 is a block diagram view of a multi-application smartcard according to the invention.

Referring still to FIG. 3, smartcard (1) includes a multi-application operating system (MULTOS). Respective second types of program data are stored in modifiable memory portions (12a) and (13a) and, when called for execution, they are moved to respective higher memory address portions (12b) and (13b) and executed. After being executed, the respective second types of program data are deleted from higher address memory portions (12b) and (13b), thereby freeing up these portions of memory for later use.

The smartcard (1) is manufactured so that it is configured to be enabled for use subsequent to the early stages of manufacturing. At this stage, both portions of the smartcard's memory (10) and (12) and (11) and (13) respectively include respective portions of the operating system wherein memory portions (12) and (13) each include respective program data of the second type that are used in the authentication of smartcard (1).

In this MULTOS embodiment, the step of enabling smartcard (1) is executed only once by means of a command in the form of CHECKDATA stored in modifiable memory portion (12a). Once this data is called for execution, it is moved from memory portion (12a) to memory portion (12b) wherein it is executed. Once the card has been enabled, smartcard (1) is configured to receive personalised data indicative of the user of the smartcard. The step of personalising smartcard (1) is executed only once by means of a command in the form of MSM SETCONTROLS stored in modifiable memory portion (13a). Once this data is called for execution, it is moved from memory portion (13a) to memory portion (13b) wherein it is executed. Subsequently, the used data is deleted from memory portions (12b) and (13b) thereby freeing up memory portions (12a), (12b), (13a) and (13b) for future use. Although the data of the CHECKDATA or MSM SETCONTROLS commands is deleted after execution of both commands, in other embodiments of the invention, the data of either of the CHECKDATA or MSM SETCONTROLS commands may be employed two or more times before being deleted from the modifiable portion of the memory.

At this stage, the card is ready to be further personalised by those providing the smartcards to an end user, however, the step of enabling and personalising smartcard (1) can not be re-executed because the second types of program data employed in this procedure have been deleted after their respective execution.

Although the invention has been described with reference to specific embodiments of the invention, it will be appreciated by those skilled in the art that it may be embodied in many other forms.

What is claimed is:

1. A method for manufacturing a smartcard having a memory means, the method including the steps of:
   storing program data of a first type which will be required throughout the life of the card in a read only memory portion of the memory means;
   storing program data of a second type which will not be required throughout the life of the card in a modifiable portion of the memory means; and
   in which the program data types are stored in their respective memory portions at the card manufacturing stage and the second type of program data is deleted once it has been employed.

2. A method for manufacturing a smartcard as claimed in claim 1 which method further including the step of:
   storing the second type of program data into a first part of the modifiable memory portion such that when it is called for, it is moved from the first part of the modifiable memory portion to a latter part of the modifiable memory portion and executed.

3. A method for manufacturing a smartcard as claimed in claim 1 in which the second type of data is used once for the process of verifying the authenticity of the card subsequent to manufacturing.

4. A method for manufacturing a smartcard as claimed in claim 3, in which:
   the verifying of the authenticity of the card takes place in the process of enabling the card, and
   once the second type of data has been used in the process of verifying the authenticity of the card, it is deleted from the modifiable memory portion of the card.

5. A method for manufacturing a multi-application smartcard having a memory means, the method including the steps of:
   storing program data of a first type for each application which will be required throughout the life of the card in respective read only memory portions of the memory means;
   storing program data of a second type for each application which will not be required throughout the life of the card in respective modifiable portions of the memory means; and in which the program data types for each application are stored in their respective memory portions at the manufacturing stage of the card and the respective parts of the second type of program data for each application are deleted once employed.

6. A method for manufacturing a smartcard as claimed in claim 5, further including the step of storing the second type of program data for one or more applications into a first part of the modifiable memory portion such that when it is called for, it is moved from the first part of the modifiable memory portion to a latter part of the modifiable memory portion and executed.

7. A method of manufacturing a smartcard as claimed in claim 5 in which the second type of program data is data employed only by an operating system on the smartcard.

8. A method of manufacturing a smartcard as claimed in claim 5, in which the respective second type of data is used once for the process of verifying the authenticity of the card subsequent to manufacturing.

9. A method for manufacturing a smartcard as claimed in claim 8 in which:
the verifying of the authenticity of the card takes place in the process of enabling the card; and
once the respective second type of data has been used in the process of verifying he authenticity of the card, it is then deleted from the modifiable memory portion of the card.

10. A method for manufacturing a smartcard as claimed in claim 5 in which both the read only and modifiable portions of the card memory include respective portions of a multi-application operating system.

11. A method for manufacturing a smartcard as claimed in claim 10 in which:
the multi-application operating system is MULTOS, and the step of verifying the authenticity of the card is executed by means of a command in the form of CHECKDATA, the command being of the second type of application program data and stored in the modifiable portion of the memory.

12. A method for manufacturing a smartcard as claimed in claim 10, further including a step of providing personalized data to the card, which data:
enables the card for use; and
is executed by means of a command in the form of SET MSM CONTROLS, the command being of the second type of application program data.

13. A smartcard having a memory means, the smartcard including:
a processing means;
a read only portion of memory in communication with the processor;
a modifiable portion of memory in communication with the processor; input and output means on the card in communication with the processor and being externally accessible; and
in which program data of a first type corresponding to data which will be required throughout the card's life is stored in the read only portion of the memory and program data of a second type corresponding to data which will not be required throughout the card's life is stored in the modifiable portion of the memory such that once the second type of data has been employed, it is deleted.

14. A smartcard as claimed in claim 13 in which the second type of data is moved from a first part of the modifiable memory portion to a second part of this memory portion when it is required and deleted from the second part of the modifiable memory portion subsequent to execution.

15. A smartcard as claimed in claim 13 in which the second type of data is employed only once during the life of the smartcard.

16. A smartcard as claimed in claim 13 in which at least a portion of the smartcards application is used only during the early stages of the card's life.

17. A smartcard as claimed in claim 16 in which the at least one portion includes card activation data which is used only once prior to the loading of any application software.

18. A smartcard as claimed in claim 16 in which the at least one portion includes personalization data.

19. A smartcard as claimed in claim 13 in which the smartcard includes a MULTOS operating system.

20. A smartcard as claimed in claim 19, in which the card is authenticated by employing a checkdata command stored in the modifiable portion of the memory means.

21. A smartcard as claimed in claim 20 in which:
once the checkdata command is executed it is moved from the first portion of the modifiable memory means to a second portion of the modifiable memory means and,
once the cards is authenticated, that data in the second portion of the modifiable memory means is deleted.

22. A smartcard as claimed in claim 21 in which, after the smartcard is authenticated it is personalized by employing a Set MSM Controls command stored in the modifiable portion of the memory means such that when executed it is moved from the first portion of the modifiable memory means to the second portion of the modifiable memory means and, once the card is personalized, that data in the second portion of the modifiable memory means is deleted.

* * * * *